United States Patent Office 3,684,645
Patented Aug. 15, 1972

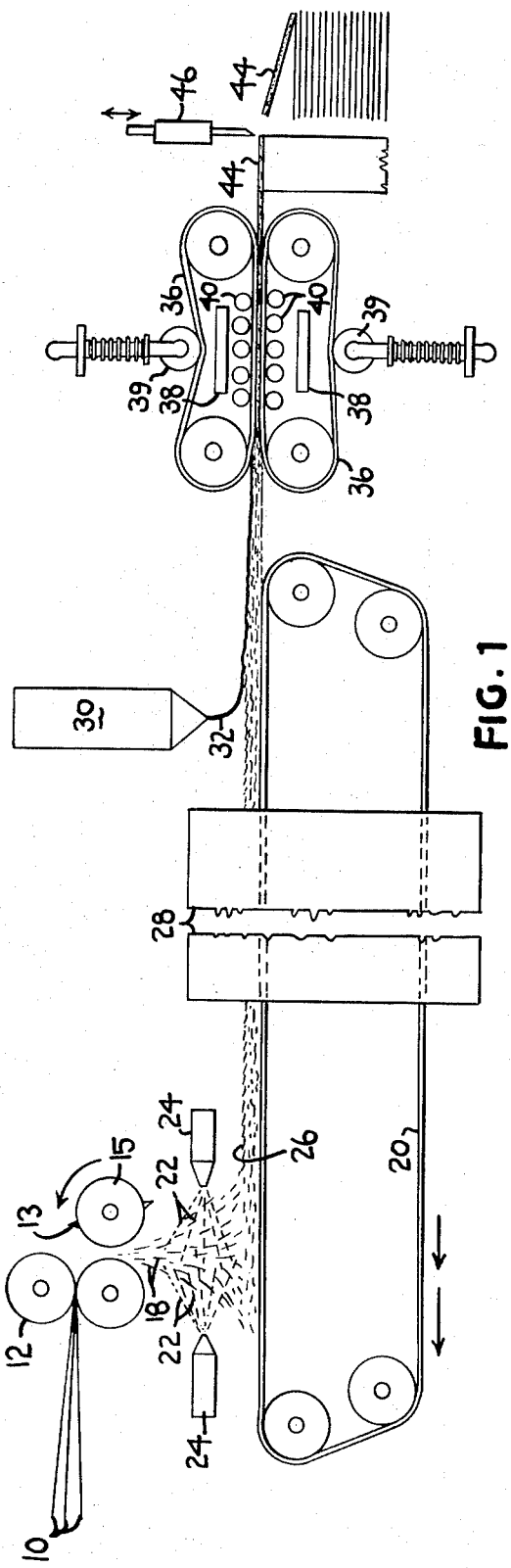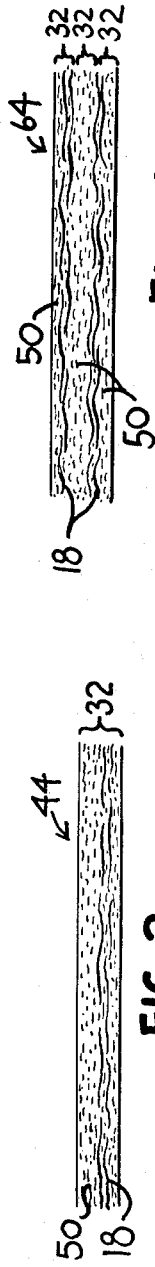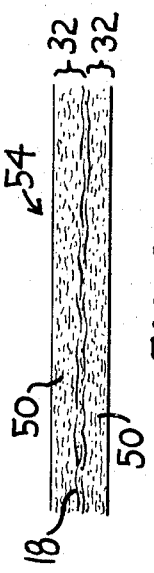

3,684,645
GLASS FIBER REINFORCED
THERMOPLASTIC ARTICLE
Chester S. Temple, Kennedy Township, Allegheny County, and Jack R. Matthews, Hampton Township, Allegheny County, Pa., assignors to PPG Industries, Inc., Pittsburgh, Pa.
Filed Mar. 25, 1969, Ser. No. 810,261
Int. Cl. B32b 5/12
U.S. Cl. 161—141
14 Claims

ABSTRACT OF THE DISCLOSURE

A glass fiber strand mat is combined with a thermoplastic resin containing short glass fibers to produce a thermoplastic resinous sheet which is reformable into various shapes by heat and pressure. The mat is formed of relatively long strands but disposed randomly so as to give uniform strength in all directions in the plane of the sheet. The relatively short glass fibers in the resin provide improved surface properties (roughness) as well as improved strength and heat resistance to the final product.

BACKGROUND OF THE INVENTION

This invention relates to reinforced thermoplastic compositions. More specifically, this invention relates to the combination of a thermoplastic material with a mat of glass fiber strands. In the preferred aspect of this invention, an extruded sheet of thermoplastic material is combined with a glass fiber mat.

Thermoplastic materials have been reinforced by a plurality of processes. For example, in some cases a woven glass cloth is dipped in a molten thermoplastic bath and is thereby coated with a thermoplastic material. This coated thermoplastic cloth can be subsequently shaped by the application of heat and pressure.

Another method for the reinforcement of thermoplastic resins is disclosed in U.S. Pat. No. 2,877,501 to Bradt. In this patent, small pellets of a thermoplastic material are reinforced with a core which comprises a plurality of glass filaments. These pellets are subsequently formed into useful articles by the application of heat and pressure. However, when the pellets are formed into a finished object, the reinforcing medium tends to form discrete bundles and as such the strength of the resulting material is adversely affected. Also, when the pellets of this patent are dispersed, as in injection molding, the fiber length is destroyed.

The combination of a powdered thermoplastic material with a fibrous reinforcing medium is disclosed in British Pat. No. 1,010,043, French Pat. No. 1,361,439 and U.S. Pat. No. 3,396,142. These patents do not disclose a reinforced thermoplastic sheet which can be manufactured inexpensively in a high volume continuous process and which can be stamped similar to the stamping of sheet metal into various parts which have high tensile strength, high impact resistance and high resistance to heat distortion.

The only continuous processes for making reinforced resinous products are those which have been developed for making glass fiber reinforced thermosetting resinous panels. Processes such as these are shown in U.S. Pats. Nos. 2,927,623 and 3,109,763. Such processes utilize individual chopped strands which are forced into a fluid "A" stage thermosetting resin. The resin and fibers are then cured in a plane or corrugated shape. This process is much too slow and costly to produce a low cost sheet as contemplated by the present invention.

It has also been proposed to impregnate a glass fiber strand mat with a thermoplastic resin to produce a sheet which can be stamped to produce articles having high strength, impact resistance and resistance to heat distortion. These articles have been unsatisfactory for the exterior parts of automobiles and other exterior parts where relatively smooth surfaces are required. Surfaces having a smoothness of about 200–400 micro inches as measured by a microcorder are required. The manufacture and stamping of the sheet result in raised portions in the sheet surface in the areas of the strands closest to the surface of the sheet.

Attempts to improve the surface smoothness of the sheet and finished article have included the use of a veil mat in combination with the strand mat with the veil mat being disposed in the article between the strand mat and the surface. The veil mat is conventionally formed of individual, long glass fibers whose diameter is substantially less than that of the strand in the strand mat. Use of a veil mat adds to the expense of the thermoplastic sheet.

The primary object of this invention is the preparation of a low cost, reinforced thermoplastic sheet from which articles which have outstanding strength and surface properties can be inexpensively made.

Another object of the invention is the reinforcement of a thermoplastic resinous sheet with relatively long glass fiber strands and relatively short glass fibers, which sheet can be stamped to produce reinforced thermoplastic articles which have outstanding strength and surface properties.

Another object of this invention is the preparation of a glass fiber reinforced thermoplastic sheet containing relatively long glass fiber strands and relatively short glass fibers which can be made in a continuous impregnating process at relatively low cost as contrasted to more expensive prior art processes.

The objects of this invention include all the other novel features which will be obvious from the specification and claims.

The objects of the invention are realized by utilizing a combination of relatively short individual glass fibers or strands and relatively long glass fiber strands to reinforce the thermoplastic resin. The short individual glass fibers or strands are preferably mixed with the thermoplastic resin and the mixture is then combined with the relatively long glass fibers strands. The combination is preferably made by impregnating the resin-fiber mixture into a glass fiber strand mat.

The strand mat can be either a commercially available chopped strand mat or a commercially available continuous swirl form of strand mat. The strands in the mat are at least 2 inches in length, and can be continuous as in the swirl form of mat. In one form of strand mat, the long strands are chopped strands which are 2 to 20 inches in length, preferably 3 to 10 inches in length. The strands are composed of a plurality of fibers usually numbering 15 to 450 fibers, preferably numbering 20 to 60 fibers. The individual fiber diameter ranges from 0.0002 to 0.001 inch, preferably 0.0003 to 0.0008 inch and the strand diameter measures at least 0.001 inch and preferably 0.0015 to 0.004 inch in diameter. The strands are randomly arranged in the mat with a major proportion of the strands being substantially straight through their length in the mat. By this is meant approximately 50 to 90 percent of the strands in the mat are straight or have a radius of curavture greater than 5 inches, preferably greater than 10 inches.

The relatively short glass fibers are approximately from $\frac{1}{16}$ up to 2 inches in length, preferably $\frac{1}{8}$ to $\frac{3}{4}$ inches. They may be obtained by chopping continuous glass fiber strands according to conventional means. The chopped strands can also then be broken down to individual fibers or mixtures of individual fibers and partially filamentized strands containing less than the original number of fibers, i.e., up to about 5 to 10 fibers. The filamentizing (fiber separation) can be accomplished beforehand. In one embodiment of the invention, scrap material from a thermoplastic sheet reinforced with glass fiber strand can be ground in a suitable mill to produce particles of ground resin and individual glass fibers.

The resin can be in powdered form as above noted or it can be in other forms such as liquid or molten form for combination with the short glass fibers. The short glass fibers and resin can be added to conventional mixing and extruding equipment for extruding molten thermoplastic resins in sheet form. The short glass fibers can be added to an aqueous emulsion or solvent solution of the resin. The glass fibers can also be added to a monomeric or partially polymerized solution of the thermoplastic resin such as caprolactam and the resinous solution and glass fibers can then be added to the glass fiber mat for polymerization of the resin in situ in the presence of the two forms of glass fibers. The short glass fibers constitute approximately 2 to 60 percent by weight of the short glass fibers-resin mixture, preferably about 5 to 50 percent by weight of the mixture.

Examples of thermoplastic resins which are suited for use in this invention include both homopolymeric and copolymeric substances, such as (1) vinyl resins formed by the polymerization of vinyl halides or by the copolymerization of vinyl halides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrenes; (2) poly-$\alpha$-olefins such as polyethylene, polypropylene, polybutylene, polyisoprene and the like, including copolymers of poly-$\alpha$-olefins; (3) phenoxy resins; (4) polyamides such as polyhexamethylene adipamide; (5) polysulfones; (6) polycarbonates; (7) polyacetals; (8) polyethylene oxide; (9) polystyrene, including copolymers of styrene with monomeric compounds such as acrylonitrile and butadiene; (10) acrylic resins as exemplified by the polymers of methyl acrylate, acrylamide, methylol acrylamide, acrylonitrile and copolymers of these with styrene, vinyl pyridines, etc.; (11) neoprene; (12) polyphenylene oxide resins; and (13) cellulose esters including the nitrate, acetate, propionate, etc. This list is not meant to be limiting or exhaustive but merely to illustrate the wide range of polymeric materials which may be employed in the present invention.

The amount of short glass fibers or strands in the reinforced thermoplastic article can range from 1 to 30 percent, preferably 5 to 10 percent, by weight of the article. The amount of long glass fiber strand in the reinforced thermoplastic article can range from 15 to 60 percent, preferably 30 to 50 percent, by weight of the article. The amount of thermoplastic resin in the reinforced thermoplastic article can range from 40 to 80 percent, preferably 40 to 60 percent, by weight of the article.

The amount of the various ingredients including, short individual glass fibers, glass fiber strands, resin fillers, colorants, etc., can vary depending upon the properties desired in the finished article. It can be seen that these properties can vary in different parts of a finished article thereby requiring differing amounts of ingredients at different locations in the article. Such variations are described in further detail in conjunction with a description of the drawings.

It is within the purview of this invention to add to the compositions of this invention compatible materials which do not affect the basic and novel characteristics of the composition of this invention. Among such materials are coloring agents, including dyes and pigments, fillers and similar additives. Additives such as antioxidants, bacteriacides, antistatic agents, stabilizers and antimarine fouling agents, may also be added. The upper limit of the quantity of additives is usually about 10 percent by weight of the product.

The long glass fiber strand and the short glass fibers as described herein can be treated with a coupling agent which has the abaility to enhance the bonding of the thermoplastic resin with the chopped strand mat. The coupling agent can be applied to the individual fibers during forming and/or to the strands in the mat. Chromic chloride complexes such as described in U.S. Pat. No. 2,611,719 and various silane and siloxane materials can be used as coupling agents in the practice of the invention. Hydrolyzable vinyl, allyl, amino, methacryloxy, epoxy, and glycidoxy silanes, their hydrolysis products and polymers of the hydrolysis products and mixtures of any of these are suitable for such use. The hydrolyzable portions of the silanes can be, for example, halo, alkoxy, and acyloxy. Some of these silanes are disclosed in U.S. Pat. Nos. 2,688,006; 2,688,007; 2,723,211; 2,742,378; 2,754,237; 2,776,910; 2,799,598 2,832,754, 2,930,809; 3,045,036 and 3,168,389, the disclosures of which are incorporated herein by reference.

Continuous sheets of the glass fiber reinforced thermoplastic sheet of this invention can be produced by extruding a continuous layer of a molten thermoplastic resin containing short glass fibers onto a chopped strand mat or continuous strand swirl mat and then applying heat and pressure simultaneously to unite the resin and mat. Processes and apparatus which utilize either a polished, calendaring roll or a polished continuous metal band are particularly adapted for use in accordance with this embodiment of the invention. Apparatus such as shown in U.S. Pat. No. 2,434,541 can be used. When forming a continuous sheet, sufficient heat must be applied so as to maintain fluidity of the thermoplastic resin; however, the amount of heat must not be such as to degrade the thermoplastic resin.

Other methods of laminating or impregnating the glass fiber mat with the resin can be employed. These methods include impregnating the mat with a mixture of powdered resin and short glass fibers and consolidating the impregnated mat by application of heat and pressure. The mat may also be impregnated with an aqueous or organic emulsion or solution of resin containing short glass fibers. The water or organic solvent is removed by appropriate means such as heat and the resin and glass fibers, both in individual and strand form, are then consolidated by application of heat and pressure.

The resulting fused sheet product in accordance with this invention has an especially high flexural strength and flexural modulus and a very smooth surface on the major faces of the sheet as a result of the short glass fibers being distributed throughout the resin. The short fibers help to reinforce the resin in the interstices of the glass fiber strand mat as well as in the surfaces of the sheet. The high flexural strength and smooth surface properties of the composition of this invention makes these compositions particularly suited for use in environments such as armor, automobile bumpers, hammer heads, automobile body parts, tank treads, ship hulls, pipe, architectural structural parts, shipping boxes, baseball bats, golf club heads, etc. The lightweight nature (specific gravity under 2) of these materials makes them doubly desirable for the above applications.

The composition of this invention is also adapted to utilize a foamed thermoplastic material. In this embodiment, a conventional heat decomposable foaming agent is incorporated in the thermoplastic resin. When heat and pressure are applied, the foaming agent is decomposed. When the pressure is removed, the thermoplastic material is still in the softened state. Accordingly, the gas produced by the decomposition of the blowing agent is allowed to expand thereby producing a foamed thermoplastic-fiber composition.

The process as taught in this invention is adapted to utilize a wide range of blowing agents; for example, blowing agents such as azobisformamide, azobisisobutyronitrile; diazoaminobenzene; N,N - dimethyl - N,N - dinitroso terephthalamide; N,N - dinitrosopentamethylenetetramine; benzenesulfonylhydrazide; benzene - 1,3 - disulfonyl hydrazide; diphenylsulfon-3,3; disulfonyl hydrazide; 4,4' - oxybis benzene sulfonyl hydrazide; p-toluene sulfonyl semicarbazide; barium azodicarboxylate; butylamine nitrile; nitroureas; trihydrazino triazine; phenylmethylurethane p-sulfonhydrazide, and sodium bicarbonate.

Sheets of material produced in accordance with the process and composition of this invention can be subsequently reformed into useful objects by processes such as compression molding, vacuum forming, drape forming, etc. This sheet material is particularly advantageous in that it can be joined by conventional techniques. It is to be noted that the material of the invention can also be joined by the use of conventional adhesives, solvent welding, heat welding, ultrasonic welding, mechanical bonding, etc.

Besides the flexural strength and flexural modulus value improvements as discussed above, the product of this invention exhibits superior low creep properties, tensile properties, chemical and water resistance, electrical properties, machining properties, fatigue properties, low thermal expansion and high and low temperature properties.

The following examples illustrate the invention. These examples are given for the purpose of illustration and not for purposes of limiting the invention. All parts percent are given by weight unless otherwise specified. The examples are described in conjunction with the process of forming the mat as illustrated in the drawing in which:

FIG. 1 is a diagrammatic view of the process for making the reinforced thermoplastic sheet;

FIG. 2 is a diagrammatic sectional view of the sheet produced as shown in FIG. 1 illustrating the strand and individual glass fiber configurations in the sheet;

FIG. 3 is a diagrammatic sectional view of another form of sheet illustrating a different configuration of strands and indivadual fibers in the sheets; and FIG. 4 is a diagrammatic sectional view of a further form of sheet illustrating a different configuration of strands and individual fibers in the sheet.

In FIG. 1 glass fiber strands 10 are delivered to a chopper 12 such as described more fully in U.S. Pat. No. 2,719,336. The strands can be fed from forming tubes, bobbins, roving packages or directly from the bushing according to conventional practices. The strands are severed into distinct lengths by sharp knives 13 mounted in one of the rollers 15 which constitute the chopper 12. The rollers extend completely across the width of the conveyor 20 upon which the chopped strands 18 are collected. The strands 18 are 2 to 20 inches in length. The examples hereinafter employ 5-inch lengths for purposes of illustration. The chopped strands 18 fall onto slowly moving conveyor 20 so that they are substantially straight and not curled. The strands are sprayed with a mat binder 22, such as a thermosetting or thermoplastic resin, by spray means 24 which are located on opposed sides of the veil of strands. The strands fall from the chopper 12 and are collected on conveyor 20 in the form of a mat 26. It is important that the spray means 24 be located sufficiently high enough above the conveyor so that the spray does not impinge on the top surface of the mat 26 and cause the strands to curl and/or redistribute in the mat.

The strands 10 are preferably delivered individually to the chopper from forming tubes. The strands delivered from forming tubes have been baked according to conventional practice and are stiffer than strands provided directly from the bushing. As individual strands they tend to fall better from the chopper into uniform but random distribution in substantially straight lengths as contrasted to being delivered as roving to the chopper or as unbaked strand directly from the bushing.

It is important that the position of the chopper above the conveyor be not too high or too low to prevent obtaining the uniform random distribution and substantially straight configuration of the strand in the mat. If the chopper is too low, the strands will not have sufficient room to fall freely in straight configuration onto the conveyor. If the chopper is too high the uniform random distribution may not be obtained. A height of about 28 to 30 inches is acceptable.

The mat 26 is then passed through an oven 28 to cure or dry the mat binder. A thermosetting mat binder is cured in the oven and this tends to hold the strands in place in the mat and give the mat structural integrity for impregnation.

The chopped strand mat 26 is then passed under an extruder 30 which extrudes a continuous layer or film of molten thermoplastic resin 32 onto the mat 26. The resin 32 contains about 10 percent by weight of short individual glass fibers based upon the weight of the fiber and resin. The glass fibers are straight, continuous filament fibers having an average length of about $3/16$ inch and an average diameter of about 0.0005 inch. The resin and fibers are supplied to the extruder in the form of a blend of powdered, granulated or pelletized thermoplastic resin and short glass fibers. They are heated, mixed and extruded in a conventional manner.

The mat 26 and fiber containing resin 32 next pass between two moving heated, continuous stainless steel bands 36 which compress them while moving under a pressure ranging from 50 to 150 pounds per square inch. The mat 26 and resin 32 are both at elevated temperatures as a result of being heated in the oven 28 and extruder 30 respectively and thus uniform impregnation of the resin into the mat is easily obtained. The belts 36 are heated by suitable means 38 in the area of travel of the mat and resin between the belts. The belts 36 are held under tension by suitable adjustable tension rolls 39 so as to apply the pressure needed to impregnate the mat with resin. Suitable back-up rollers 40 also aid in supplying the impregnating pressure. The fiber glass reinforced, thermoplastic sheet 44 is then cut into appropriate sizes by slitter 46 for shipment to locations for reshaping into useful articles as listed above.

Variations of the process illustrated in FIG. 1 are contemplated. The strand mat can be a continuous strand swirl mat such as is produced according to the process shown in U.S. Pat. No. 3,292,013. The strand (chopped or swirl) can be deposited on and forced into a layer of extruded resin such as resin 32 in contrast or in addition to having an extruded layer of resin 32 deposited on top of the strand mat as shown in FIG. 1. In such case the additional extruded resin layer may or may not contain short individual glass fibers depending on whether or not smooth, strong surfaces are desired on both sides of the sheet. When the strand is deposited on and forced into an extruded layer as just described, the mat binder curing oven 28 may be dispensed with.

The product 44 produced as shown in FIG. 1 is diagrammatically illustrated in cross-section in FIG. 2. Short glass fibers 50 are distributed throughout the resin matrix whereas the longer glass fiber strands 18 tend to be displaced inwardly from the top surface a greater distance than from the bottom surface where they are closely adjacent to the surface. Due to a filtering action by the glass fiber strands 18 during the impregnation, the concentration of short glass fibers 50 is greatest in the top surface of sheet 44 and gradually decreases through the thickness of the sheet to the bottom surface. For example, the average concentration of short glass fibers in the top surface layer, i.e., 0.01–0.02 inch deep layer is about 10 to 50 percent by weight, preferably 20 to 40 percent by weight, based upon the weight of resin and fibers 50, whereas the average concentration of short fibers throughout the region of sheet containing the long glass fiber strands is about 2 to 20 percent by weight, preferably 5 to 15 percent by weight based upon the weight of short glass fibers 50 and resin, or about 1 to 10 percent by weight, preferably 2 to 8 percent by weight, based upon the weight of short individual glass fibers 50, resin and glass fiber strand 18. In any event, the concentration of short individual glass fibers 50 is less in the portions of the sheet containing the strands 18 than in the surface portions of the sheet not containing the strands when the process of FIG. 1 is employed.

The majority of short glass fibers in the major surface layer(s) of the products of this invention are oriented at an angle to the plane of the major surfaces and the plane of the long fiber strands in the product. This reduces the area and volume of glass fibers that can protrude or cause roughness in the major surfaces. By "majority" of the short glass fibers is meant 50 percent by weight and greater. This alignment of the short fibers also reduces the tendency of the surfaces to "orange peel" upon cooling of the stamped part. The angularity of these short fibers in the surface is believed to be caused by the fibers crossing over each other and bending as the glass fiber-filled resin is introduced into the mat of glass fiber strands. Most of the short fibers are oriented at a slight angle, i.e., 1 to 15 degrees, however, some of the fibers are oriented so as to be at greater angles, i.e., 15 to 60 degrees, with some being at right angles to the major surface.

FIG. 3 is a diagrammatic cross-section of a sheet 54 made as described above wherein a glass fiber strand mat 26 is sandwiched between two layers of extruded resin 32 containing short glass fibers 50 and the mat 26 and resin layers are consolidated by heat and pressure. In sheet 54, both major surfaces of the sheet have higher concentrations of short fibers 50 in their surface layers for a depth of about 0.02 inch than in the interior portions of the sheet containing the strands 18 and the glass fiber strands are of a lower concentration in these surface layers than immediately inwardly of the surface layers.

In FIG. 4 there is shown a sheet 64 which is prepared by laminating two layers of glass fiber strand mat 26 alternately with three layers of the extruded resin 32 containing short glass fibers 50 and consolidating the layers with heat and pressure. Sheet 64 has surface layers similar to sheet 54 but in addition has additional reinforcement in the central portion of the sheet in the form of short chopped strands or short, chopped individual continuous filament glass fibers.

EXAMPLES

Samples of glass fiber reinforced thermoplastic sheets are made utilizing the following glass fiber reinforcements:

(A) Chopped strand mat composed of 5 inch length strands made up of filaments having a diameter of 0.00036 inch. The strand is sized during forming with a size containing a polyvinyl acetate binder, a lubricant and two coupling agents, a vinyl triacetoxy silane and an amino silane as described in U.S. Pat. No. 3,168,389. The mat weight is 1½ ounces per square foot. The strands are randomly disposed in the mat with more than 50 percent of the strands being substantially straight. The strand has an approximate diameter of 0.0035 inch.

(B) Individual glass fibers formed from strands as described in A but chopped to lengths of ⅛ inch and filamentized (by tumbling in a ball mill). The ball mill treatment is sufficient to separate the majority of the strands into individual fibers with the remaining fibers being in bundles of up to 10 fibers. The ball mill treatment does not shorten the length of very many of the fibers.

(C) Continuous strand mat composed of continuous lengths of strands oriented in swirls in the mat as illustrated in U.S. Pat. No. 2,671,745. The strands are sized with an aqueous solution containing only an amino silane coupling agent. The strands are made up of 25 filaments each with each filament having an approximate diameter of 0.00075 inch. The strand has an approximate diameter of 0.0035 inch.

The strands are all of "E" glass and coated with the same kind and amount of mat binder in order to make comparison of the physical properties of the sheets properly informative. Although the size on the strand in mat C is different from that in mat A, this difference does not materially affect the comparative nature of the test results. The mat binder employed is composed of a polyvinyl acetate resin and an amino silane.

Mats as described in A and C are laminated and impregnated with layers of polypropylene resin. The layers of resin either contain no short glass fibers or contain 40 percent by weight of individual glass fibers prepared as described in B. The mats and resin layers are 8⅞ inch by 8⅞ inch with the mat weighing 1½ ounces per square foot and each resin layer being 0.0017 inch in thickness. Various plies of mat and of resin are combined alternately and molded under heat and pressure. The mats and sheets are placed in a press at room temperature and the press is closed to exert a pressure of about 40 pounds per square inch. The temperature in the press is gradually increased to about 420° F. over a thirty minute period. At this point the pressure is increased to about 160 pounds per square inch. The temperature of the press is then gradually reduced to 100° F. over a ten minute period while maintaining the mold pressure at 160 pounds per square inch. The molded sheet is then removed from the press and cooled to room temperature. The sheets are allowed to sit at room temperature and pressure for 24 hours before being tested for physical properties.

EXAMPLES 1–7

The following sheet products produced as described from superposed layers of mat and resin are formed to illustrate the preferred embodiments of the invention and advantages of the invention:

(I) Sheet I

Resin layer with short glass fibers B
Glass fiber strand mat A (II) Sheet II

Resin layer with short glass fibers B
Glass fiber strand mat A
Resin layer without short glass fibers (III) Sheet III Resin layer with short glass fibers B
Glass fiber strand mat A
Resin layer with short glass fibers B (IV) Sheet IV Resin layer with short glass fibers B
Glass fiber strand mat C
Resin layer with short glass fibers B (V) Sheet V Resin layer with short glass fibers B
Glass fiber strand mat A
Resin layer with short glass fibers B
Glass fiber strand mat A
Resin layer with short glass fibers B (VI) Sheet VI Resin layer with short glass fibers
Glass fiber strand mat C
Resin layer with short glass fibers B
Glass fiber strand mat C
Resin layer without short glass fibers (VII) Sheet VII Resin layer with short glass fibers B
Glass fiber strand mat A
Resin layer without short glass fibers
Glass fiber strand mat A
Resin layer with short glass fibers B Test samples are prepared and tested for flexural strength and modulus (ASTM D790–49) for surface roughness (microcorder), and for Izod impact strength (ASTM D256).

Additional methods of forming the sheet of the present invention are illustrated by the following examples.

EXAMPLE 8

The following ingredients are blended to a uniform mixture, fed into a conventional extruder, heated to 500° F. to melt the resin and extruded into a continuous sheet approximately 0.1 inch in thickness.

| Ingredients: | Percent by weight |
|---|---|
| Powdered polypropylene resin pellet | 52 |
| Individual glass fibers ¼ inch long | 8 |
| Glass fiber strands 5 inches long | 40 |

EXAMPLE 9

The mixture described in Example 8 is formed in a continuous layer on a moving belt and the mixture is consolidated by heat (450° F.) and pressure (75 p.s.i.) from a coacting moving belt and drum to form a glass fiber reinforced thermoplastic sheet composed of resin and the two different forms of glass fiber.

EXAMPLE 10

A mixture of powdered resin and short glass fibers as described in Example 8 is deposited as a continuous layer on a glass fiber strand mat A as described above and the components are consolidated by heat (450° F.) and pressure (75 p.s.i.) in a heated press for 2 minutes to produce a glass fiber reinforced thermoplastic sheet.

EXAMPLE 11

The mixture of short glass fibers and powdered resin as in Example 8 is prepared as an aqueous suspension and combined with a glass fiber strand mat A as described above to obtain impregnation of the mat. The water is removed from the impregnated mat by heating for about 2 minutes at about 370° F. and the mat, fibers and resin are consolidated by heat and pressure as described in Example 8.

The combining of the resin and short glass fibers can be accomplished by adding the fibers to monomeric solutions of the resin and polymerizing the resin either before or after the mixture is combined with the glass fiber strand mat.

Similar results are obtained with resins other than polypropylene. When other resins are used, the best results are obtained by using specific mat binders for specific resins. For example, the mat binder for polyvinylchloride resin is polyvinylchloride, for styrene-acrylonitrile resin is a styrene-acrylonitrile emulsion, for polysulfone resin is an acrylic resin and for phenoxy resin is an acrylic resin.

The products of the present invention have improved strength because the short fibers which are distributed throughout the resinous sheet serve to add additional strength to the resin in the interstices of the long glass fiber strand mat. In the reinforcement of the resin sheets by conventional glass fiber strand mats there is a maximum percentage of glass fiber mat that can be used economically in the composite article because of the extreme length of time which is required to get complete impregnation of a very dense reinforcing mat. Thus the practical density of such mats is limited. By practice of the present invention, the amount of effective glass reinforcement is increased in an economic manner in a short period of time and resin-glass fiber composites of improved strengths are obtainable.

The combination of short fibers within the resin filled interstices of long fibers provides improved stampability to the glass fiber reinforced thermoplastic sheet. The reason for this is not clearly known but a theory is that the short fibers permit bending of the sheet more readily than the long fibers while retaining the strength properties in the areas where the sheet flows during bending. The glass content (percentage) is thus maintained throughout the shaped part. Also, it is believed that the presence of short fibers in this matrix facilitates stress transfer to the long fiber strands thereby giving more uniform glass-resin flow during stamping.

Although the invention is described with regard to specific details of certain preferred embodiments, it is not intended that such details serve as limitations on the scope of the invention except as set forth in the accompanying claims. For example, in the manufacture of the reinforced sheet, a plurality of plies of fiber-containing resin layers and glass fiber strand mats can be employed to provide thicker sheets or sheets having surface layers of resin different from interior layers in order to produce shaped products of differing properties.

We claim:
1. A thermoplastic resinous product reinforced with randomly oriented long glass fiber strands and having short glass fibers reinforcing the resin filled interstices of said long glass fiber strands.

2. A reinforced resinous product as described in claim 1 wherein the short fibers are in strand form.

3. A reinforced thermoplastic resinous product as described in claim 1 in sheet form suitable for shaping upon application of heat and pressure.

4. A reinforced thermoplastic resinous sheet product as described in claim 3 having said glass fiber strands in its interior portions and glass fibrous reinforcement comprising a predominance of short glass fibers in at least one of its major surface portions.

5. The products described in claim 3 wherein the short glass fibers have an average length of 1/16 up to 2 inches.

6. The products described in claim 4 wherein the short glass fibers have an average length of 1/16 up to 2 inches.

7. A sheet as described in claim 4 wherein a majority of the short fibers in the resin matrix are oriented at an angle to the major plane of the long strands.

8. The products described in claim 1 wherein the short glass fibers have an average length of 1/16 up to 2 inches.

9. The products described in claim 8 wherein the products are composed of in percent by weight of the product of 1 to 30 percent short glass fibers, 15 to 60 percent long glass fiber strands and 40 to 80 percent of resin.

10. The products described in claim 9 wherein the surface portions are 0.01 to 0.02 in thickness and contain 10 to 50 percent by weight of short glass fibers based upon the weight of short glass fibers and resin.

11. A method of making a reinforced resinous sheet which comprises preparing a mixture of short glass fibers dispersed in a resin and combining the mixture with long glass fiber strands to make a reinforced resinous product.

12. In the method of making a reinforced resinous product which comprises combining the resin with long glass fiber strands and shaping the combination to form a reinforced resinous product, the improvement which comprises dispersing short glass fibers in the resin prior to combining it with the strands.

13. The improvement as described in claim 12 wherein the fibers are added to the resin while it is in at least partially monomeric form.

14. The improvement as described in claim 12 wherein the monomer is caprolactam.

References Cited
UNITED STATES PATENTS

| | | | |
|---|---|---|---|
| 2,726,185 | 12/1955 | Howald | 161—181 |
| 2,731,066 | 1/1956 | Hogendobler et al. | 161—141 |
| 2,936,487 | 5/1960 | Paz | 264—108 |
| 3,410,741 | 11/1968 | Barnett | 161—DIG 4 |
| 3,385,749 | 5/1968 | Hampshire | 161—164 |
| 3,410,741 | 11/1968 | Barnet | 161—DIG 4 |
| 3,498,872 | 3/1970 | Sterman et al. | 161—93 |

ROBERT F. BURNETT, Examiner

L. C. KOECKERT, Assistant Examiner

U.S. Cl. X.R.

156—166, 296; 161—170, Dig. 4; 264—257

PO-1050
(5/69)

UNITED STATES PATENT OFFICE
CERTIFICATE OF CORRECTION

Patent No. 3,684,645          Dated August 15, 1972

Inventor(s) Chester S. Temple and Jack R. Matthews

It is certified that error appears in the above-identified patent and that said Letters Patent are hereby corrected as shown below:

Column 11, line 9 "3,410,741" should read --3,328,501--.

Signed and sealed this 29th day of May 1973.

(SEAL)
Attest:

EDWARD M. FLETCHER, JR.
Attesting Officer

ROBERT GOTTSCHALK
Commissioner of Patents